ns Patent [19]

United States Patent [19]
Mehrgardt

[11] Patent Number: 4,683,497
[45] Date of Patent: Jul. 28, 1987

[54] TELEVISION RECEIVER FOR FLICKER-FREE REPRODUCTION OF AN INTERLACED VIDEO SIGNAL

[75] Inventor: Soenke Mehrgardt, March-Neuershausen, Fed. Rep. of Germany

[73] Assignee: Deutsche ITT Industries GmbH, Freiburg, Fed. Rep. of Germany

[21] Appl. No.: 794,518

[22] Filed: Nov. 4, 1985

[30] Foreign Application Priority Data

Nov. 8, 1984 [EP] European Pat. Off. ........ 84113457.0

[51] Int. Cl.$^4$ ............................................ H04N 5/208
[52] U.S. Cl. .................................... 358/166; 358/160; 358/37
[58] Field of Search ................. 358/166, 167, 105, 36, 358/37, 160

[56] References Cited

U.S. PATENT DOCUMENTS

| | | | |
|---|---|---|---|
| 4,272,787 | 6/1981 | Michael et al. | 358/160 |
| 4,364,090 | 12/1982 | Wendland | 358/160 |
| 4,400,719 | 8/1983 | Powers | 358/160 |
| 4,415,931 | 11/1983 | Dischert | 358/166 |
| 4,455,572 | 6/1984 | Molden | 358/160 |
| 4,598,309 | 7/1986 | Casey | 358/11 |

FOREIGN PATENT DOCUMENTS 0155083 7/1978 Japan .
2000413 1/1979 United Kingdom .

*Primary Examiner*—Michael A. Masinick
*Assistant Examiner*—E. Anne Toth
*Attorney, Agent, or Firm*—T. L. Peterson

[57] ABSTRACT

A high definition TV receiver includes a single frame memory arranged with three memory areas, three multiplexers, a movement detector, a half image interpolator and a control circuit to provide flicker-free video reproduction.

3 Claims, 15 Drawing Figures

FIG. 5B  A1/A2
FIG. 5C  B2
FIG. 5D  A2/B1

TELEVISION RECEIVER FOR FLICKER-FREE REPRODUCTION OF AN INTERLACED VIDEO SIGNAL

BACKGROUND OF THE INVENTION

The invention pertains to a television receiver whereby an interlaced video signal containing fields is reproduced flicker-free after analog-to-digital conversion, digital processing, and digital-to-analog conversion, comprising digital memories for the digital video signal, a digital movement detector, and a digital field interpolator whose output provides the digital flicker-free video signal.

The picture quality of currently obtainable television receivers is so good that any further improvement appears impossible in view of the inherent properties of the television systems currently in use. The main reason for this lies in the interlaced scanning system, in which each television picture is divided into two fields which are transmitted at a frequency of 50 Hz or 60 Hz. This results in two types of spurious effects, namely in large-area flicker at the field frequency, which is particularly annoying in the European 50-Hz systems, and in so-called edge flicker, which occurs at horizontal edges of objects in the picture at the frame frequency of 25 Hz or 30 Hz. The latter effect not only is very annoying, especially when characters are superposed on the screen, but also reduces the subjective picture resolution, because fine structures appear to dance and cannot be distinguished very well.

To eliminate flicker, the pictures must be presented at a rate higher than the limit of the response of the human eye, which is about 70 Hz. This requires picture memories in the television receiver, and switching must take place between different picture-frequency-increasing methods depending on whether moving or still scanning lines are present, cf. G. Drechsler, "Tagungsband der 11. Jahrestagung der FKTG", June 1984, pp. 558 to 578.

To illustrate one possibility of eliminating flicker, let us consider three successive frames A, B, C, each of which is divided into two fields A1, A2; B1, B2; C1, C2 in interlaced scanning, and which are transmitted and received in this order. One way of avoiding flicker is to present each pair of fields twice, so that frame A is formed on the screen by the four fields in the order A1, A2, A1, A2, which are reproduced at twice the field frequency. This doubling eliminates large-area flicker completely, and edge flicker to a large extent.

However, difficulties are encountered with moving scenes, because, after the later movement phase contained in the second field A2, the earlier phase of the field A1 appears again, which results in the display of jerky and jagged movements that are unpleasant to view. In the presence of movements, therefore, it is necessary to switch to the field sequence A1, A1, A2, A2, so that the fields are doubled in direct succession.

The switching between these two possibilities of reproduction is effected from picture element to picture element by means of the above-mentioned movement detector, which determines the degree of movement on the basis of the difference between the last picture and the newly received picture information. For movement detection, information delayed by one frame must thus be available from the frame memory. Since, in practice, switchover from one field sequence to another results in further considerable picture disturbance, it is known from the above reference to gradually change from one field sequence to the other depending on the degree of movement.

In the reproducing method just described, the field frequency is doubled, as mentioned above. Since secondary effects, such as line crawl, cannot be eliminated in this manner, the above reference indicates that the field pairs can be combined into fields and reproduced sufficiently fast. However, nothing is said in the reference about the number of memories required for this purpose.

German Offenlegungsschrift DE No. 32 03 978 A1 describes a field-frequency-doubling arrangement which uses three field memories. These are interconnected by a suitable arrangement of multipoint switches. The received digital video signal is written alternately into two field memories. As long as the signal is being written into the first field memory at the normal field rate, the preceding field stored in the second field memory is available for readout at twice the write-in rate. With the third field memory, a further signal delay is produced, so that, if the switches are operated in a suitable manner, a pair of successive fields is available at the output of each of the three field memories. Theoretically, both doubly fast field reproduction and corresponding frame reproduction can be achieved with this system.

As investigations have shown, considerable difficulties are encountered in the practical realization of this arrangement. For example, in certain readout phases, the fields must be simultaneously read from and written into the third field memory at double speed, so that this memory must operate at four times the incoming data rate.

SUMMARY OF THE INVENTION

Accordingly, the object of the invention as claimed is to find a simpler memory arrangement for flicker-free reproduction of video signals and to design the sequence control circuit for this memory arrangement in such a way that it can be implemented with a single integrated circuit that occupies a chip area not greater than the maximum size of mass-produced state-of-the-art devices. The attainment of this object is predicated on the discovery that flicker-free frame reproduction in the above sense is also possible with a single frame memory which is cleverly organized. Thus, compared with the arrangement disclosed in the above-mentioned Offenlegungsschrift, the arrangement in accordance with the invention has the big advantage of requiring one field memory less.

BRIEF DESCRIPTION OF THE DRAWING

The invention will be better understood from a reading of the following detailed description in conjunction with the drawing in which:

FIGS. 4A–4D show an allocation scheme for a first variant of the invention, the scheme corresponding to that of FIG. 2;

FIGS. 5A–5D show an allocation scheme for a second variant of the invention.

DETAILED DESCRIPTION

Figure 1:
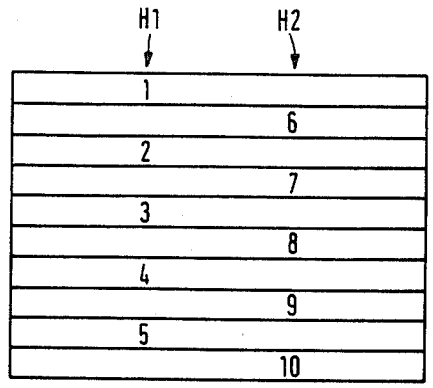
FIG. 1 shows schematically the arrangement of the lines in the interlaced scanning system.

To simplify the explanation of the invention with the aid of the figures, it will be assumed that each field H1, H2 of the transmitted and received television picture consists of 5 alternately interleaved lines, as shown in FIG. 1. Thus, lines 1 . . . 5 of the field H1 are interleaved with lines 6 . . . 10 of the second field H2 to form the line sequence 1, 6; 2, 7; . . . 5, 10.

Figure 2:
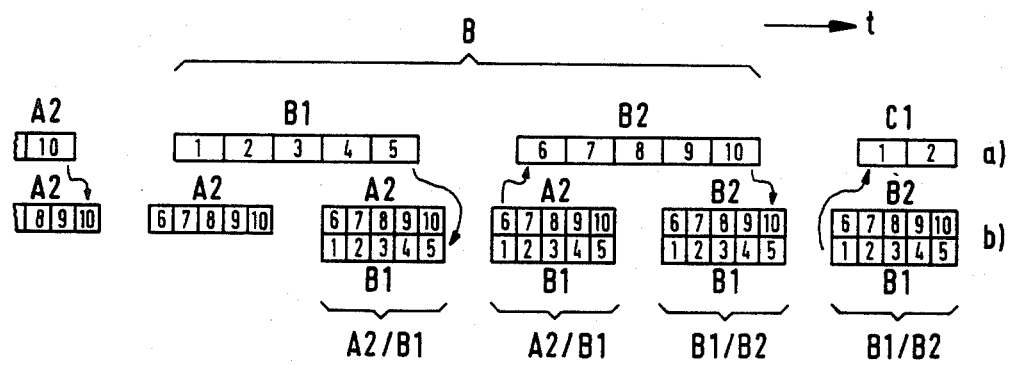
FIG. 2 shows an allocation scheme for the lines of FIG. 1 in the frame memory of the invention.

FIG. 2 shows an allocation scheme for the writing into and the readout at twice the write-in speed from the frame memory vs (FIG. 3) of the invention. As indicated by the arrow t, the allocation scheme is to be understood as relating to time, i.e., it shows how the individual lines are written into and read from the frame memory vs successively in time. Line a of FIG. 2 shows the "slow" (horizontal-frequency) write-in of the fields B1 and B2 of the frame B. The picture element delayed by the duration of one frame can first be read out and then be replaced by the new picture element plus the movement information. Line b of FIG. 2 shows the readout of the successive field pairs A2/B1, A2/B1, B1/B2, B1/B2 at twice the write-in speed. From this it follows that each of these field pairs can be read out twice, so that 100-Hz frame reproduction is possible. The critical points during readout are marked by curved arrows; the lines 5 and 10, marked by downwardly pointing arrows, must have been written in before they can be read out, and the lines 1 and 6, marked by upwardly pointing arrows, must not be overwritten until they have been read out.

The spaces between the individual fields correspond to the retrace lines, which need not be stored in the frame memory. The times required for write-in and for readout show that the write-in time is precisely twice as long as the readout time. During write-in, therefore, readout on a time-division-multiplex basis, which is necessary for the movement detector bt (FIG. 3), is possible without exceeding the data transfer rate necessary for readout at twice the write-in speed.

Figure 3:
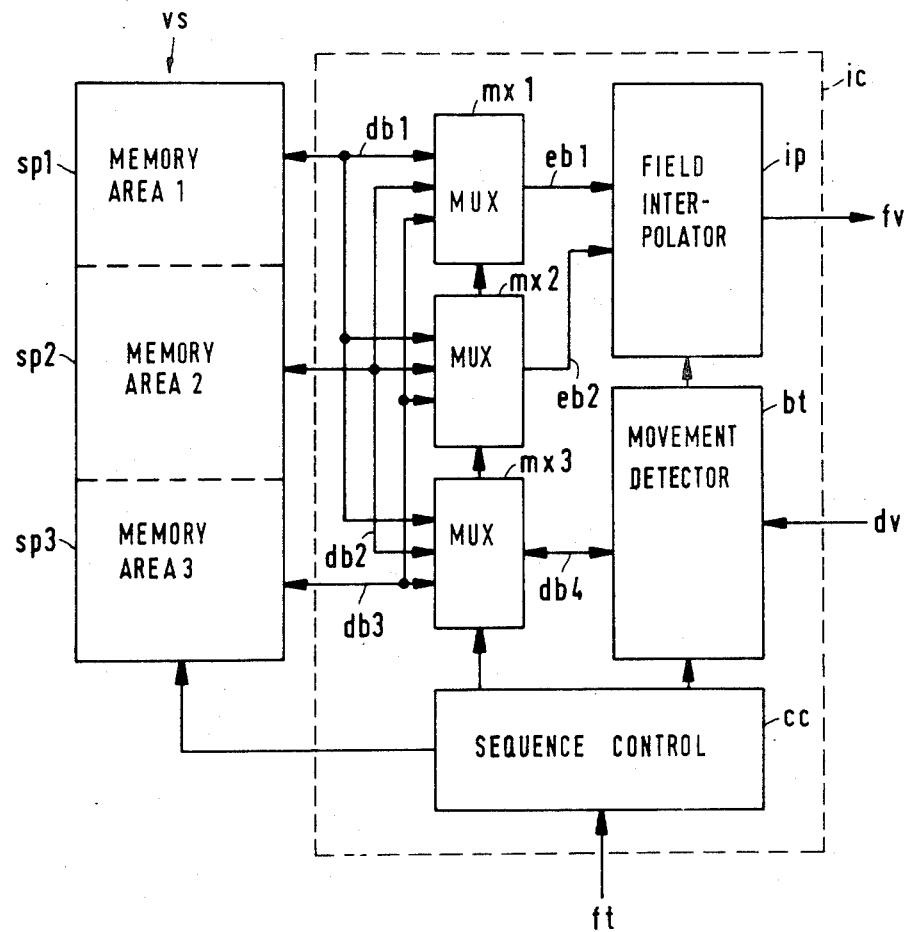
FIG. 3 is a block diagram of an embodiment of the subcircuits that are essential for the invention.

FIG. 3 shows a block diagram of an embodiment of the invention. The frame memory vs consists of three memory areas sp1, sp2, and sp3. Associated with these memory areas are the first multiplexer mx1, the second multiplexer mx2, and the third multiplexer mx3, respectively, which are connected to these areas by the first, second, and third bidirectional data buses db1, db2, and db3, respectively. The data transfer on these buses (in blocks) is in only one direction, i.e., although the buses are bidirectional, data communication never takes place in both directions at a time.

The first multiplexer mx1 and the second multiplexer mx2 are also connected to the first and second inputs of the field interpolator ip via the first and second unidirectional data buses eb1 and eb2, respectively. Therefore, the two multiplexers mx1, mx2 are preferably unidirectional multiplexers, whereas the multiplexer mx3 must transmit data in both directions and is therefore connected via the fourth bidirectional data bus db4 to the movement detector bt, which is presented with the digital video signal dv. The output of the field interpolator ip provides the digital flicker-free video signal fv.

The sequence control circuit cc, which is controlled by a clock signal ft from a clock generator (not shown) that also generates further clock signals for the individual digital subcircuits of the television receiver, controls the horizontal-frequency writing into, and the single or double readout at twice the horizontal frequency from, the three memory areas of the frame memory vs. The information of the line, hereinafter referred to as "data word", is compressed to one-half of a line period prior to write-in w; this can be done in a suitable stage of the movement detector bt or in a stage specifically provided for this purpose. This makes it possible to interleave the individual data words in time in the three memory areas sp1, sp2, sp3, as will be explained below with the aid of FIGS. 4 to 6.

The construction of the sequence control circuit cc will be apparent to those skilled in the art from the following description of the time sequence for the writing into and readout from the frame memory vs. In the first variant of the solution according to the invention, the data words of the field H1 of FIG. 1, i.e., those of lines 1 to 5, are divided into two blocks, and those of the second field H2, i.e., those of lines 6 to 10, into two sections. FIGS. 4, 5, and 6 show how these word blocks and word sections are written into and read from the three areas of the frame memory vs serially in time. They show temporal allocation schemes for the three memory areas. In each of the stripes shown in these figures, the top row is allocated to the memory area sp1, the middle row to the memory area sp2, and the bottom row to the memory area sp3.

In FIGS. 4A-D, 5A-D, and 6A-D, the blocks and sections of the data words of the individual lines are not distinguished from one another by reference characters, but the blocks and sections belonging to a line are designated by the number of this line. In the variant of the solution shown in FIG. 4, the first word block of an nth line, where n is an integer of the sequence 1, 4, . . . N/2, were N is the number of frame lines or only the number of lines containing picture information of a frame, is stored in the first memory area sp1, and the second word block of this line in the second memory area sp2; the first word block of line n+1 is stored in the third memory area sp3, and the second word block of this line in the first memory area sp1; the first word block of line n+2 is stored in the second memory area, and the second word block of this line in the 3rd memory area; this takes place during write-in w.

Figure 4A:
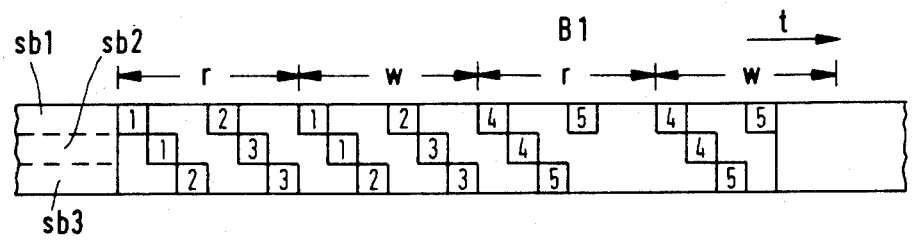
Figure 4C:
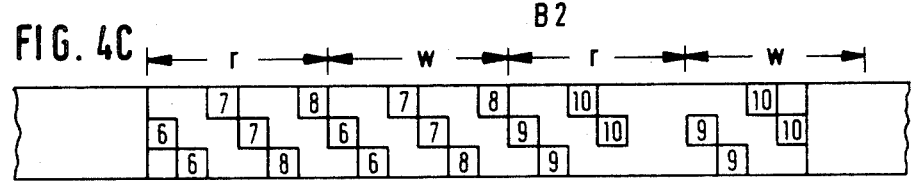

Analogously, as shown in FIG. 4c, the first word section of an mth line, where m is 1+N/2, 4+N/2, . . . N, is stored in the second memory area sp2, and the second word section of this line in the third memory area sp3; the first word section of line m+1 is stored in the first memory area sp1, and the second word section of this line in the second memory area sp2; the first word section of line m+2 is stored in the third memory area sp3, and the second word section of this line in the first memory area sp1. It can be seen that the allocation of the data words of the first field H1 is staggered with respect to that of the second field H2 in the individual memory areas, which is an essential idea of the invention.

Figure 4D:
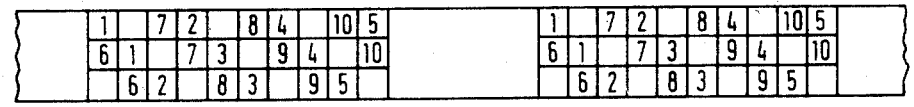

During the second half of the duration of three successive lines, e.g., 1, 2, 3; 6, 7, 8, hereinafter referred to as "triple sequence" (the triple sequence thus begins with the mth or nth line), that data word of the respective mth or nth line which was delayed by one frame period is read from the frame memory vs, see portion r in FIGS. 4A-D to 6A-D, and compared with the data word of the mth or nth line in the movement detector bt. During the first half of the duration of the next triple sequence of lines, it is written, together with the movement information, into the memory areas containing the data word delayed by one frame period, thereby replacing this data word. Finally, the first, second, and third word blocks of each data word of the nth line are read out together with the corresponding sections of each data word of the mth line, which is done once or twice at twice the horizontal frequency, as was stated above. FIGS. 4B, 4D, 5B, 5D, 6B, and 6D show schematically the temporal assignment of the sections stemming from the individual lines of the fields. Thus, like word blocks and word sections of corresponding lines belong together, as shown in FIGS. 4B and 4D by the line numbers 1, 6; 7, 2; 2, 7, etc., which are in the same column. From the above-explained distribution of the data words among the individual memory areas, it is apparent that, because of the horizontal-frequency write/read cycle and the doubly fast read cycle, each memory area is needed for only a single data transfer at a time. This has the advantage that the data buses are always uniformly loaded. In addition, as is indicated by the dashed rectangle in FIG. 3, it is possible to integrate the subcircuits arranged within this rectangle in a single integrated circuit ic without encountering any problems with the complexity or the number of external terminals of the integrated circuit.

Figure 5A:
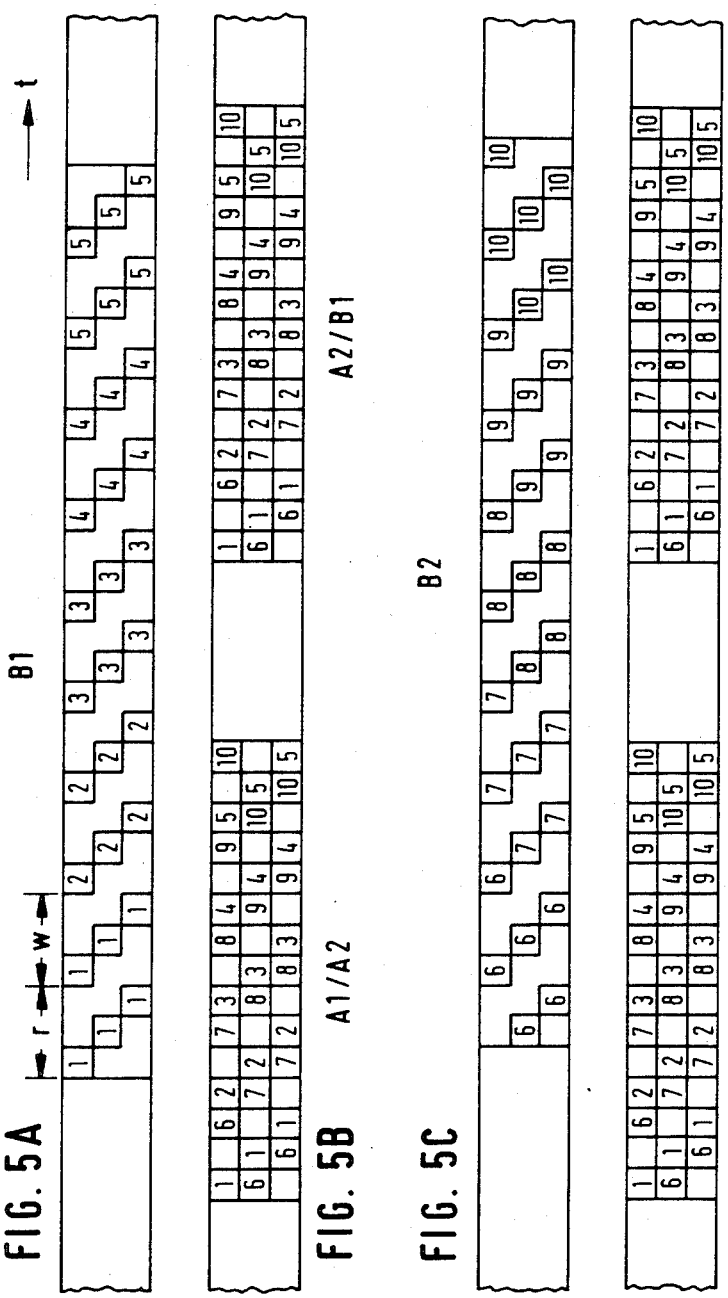

The four allocation schemes of FIG. 5 apply to a different division of the data words, namely into three blocks and sections per word. As can be seen in FIG. 5a, the serial write-in is effected so that the first word block is stored in the first memory area sp1, the second word block in the second memory area sp2, and the third word block in the third memory area sp3. As shown in FIG. 5c, the first word section is stored in the second memory area sp2, the second word section in the third memory area sp3, and the third word section in the first memory area sp1. As can be seen in FIGS. 5b and 5d, like data-word sections are again arranged one above the other in columns; they are read out at twice the horizontal frequency. Otherwise, the processing in the movement detector bt and the re-storing during the period w are analogous to the operations in the variant of FIG. 4.

FIG. 6 shows the data word allocation scheme for a third variant of the solution according to the invention, in which the data words are divided into four blocks and sections. In this case, the first word block of an nth line is written into the first memory area sp1, the second word block into the second memory area sp2, the third word block into the third memory area sp3, and the fourth word block into the first memory area sp1. The first word block of line n+1 is written into the second memory area sp2, the second word block into the third memory area sp3, the third word block into the first memory area sp1, and the fourth word block into the second memory area sp2. The first word block of line n+2 is written into the third memory area sp3, the second word block into the first memory area sp1, the third word block into the second memory area sp2, and the fourth word block into the third memory area sp3.

Figure 6A:
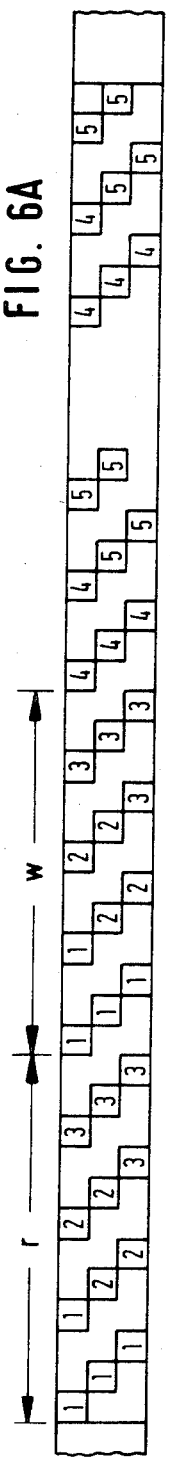
FIGS. 6A-6D show an allocation scheme for a third variant of the invention.
Figure 6B:
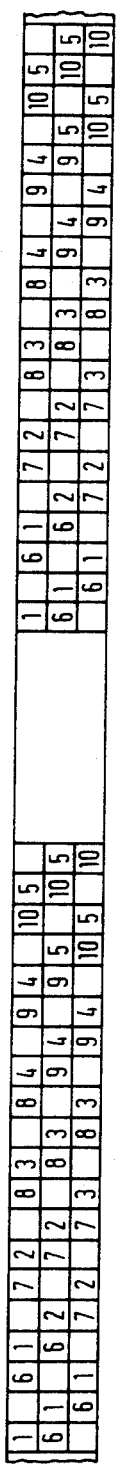
Figure 6C:
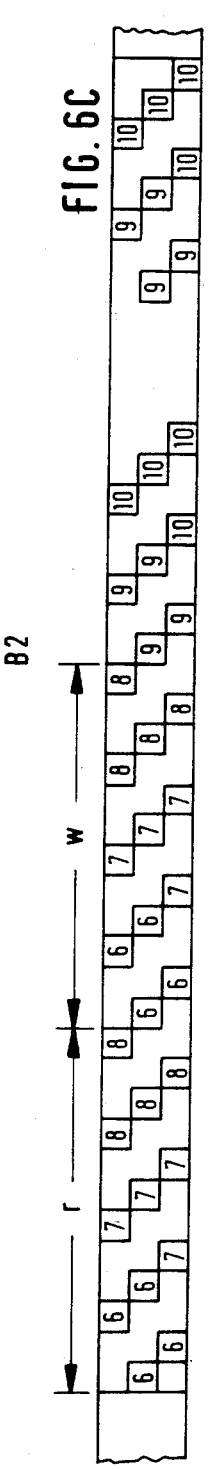
Figure 6D:
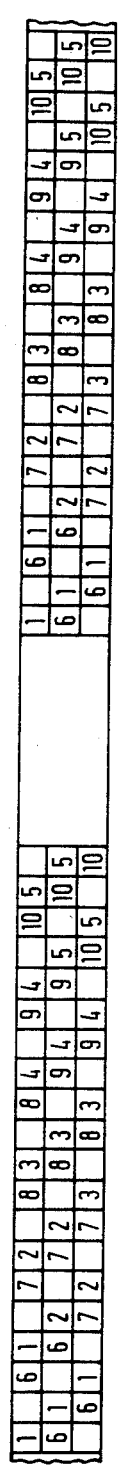

The storage of the four word sections of an mth line begins as the first word section is written into the second memory area sp2, the second word section into the third memory area sp3, etc., as shown in FIG. 6c. In this case, too, the other operations are analogous to those in the two other variants of the solution shown in FIGS. 4A-D and 5A-D.

The frame memory vs and the integrated circuit ic can be implemented using any of the integration technologies commonly employed for digital circuits, particularly insulated-gate field-effect transistor technology, i.e., MOS technology. The invention can then cooperate with digital integrated signal-processing circuits for television receivers, which are described in the literature, cf., e.g., "Electronics", Aug. 11, 1981, pp. 97 to 103. In the television receiver according to the invention, the above-mentioned conversion of the video signal derived in the television receiver on the analog side into a digital video signal and the subsequent processing of this signal on the digital side can be performed in the manner described in the foregoing. For this reason, the corresponding subcircuits are not shown in the figures of the accompanying drawings, but it is assumed that the digital video signal dv of FIG. 3 is provided by the prior art subcircuits mentioned above.

What is claimed is:

1. A television receiver whereby an interlaced video signal containing fields is reproduced flicker-free, said receiver comprising:

a digital movement detector receiving digital video signals;

a digital field interpolator having an output which provides said digital flicker-free video signal;

a single frame memory which is divided into first, second and third memory areas;

first, second and third bidirectional data buses each respectively associated with said first, second and third memory areas and used for word-section/-word-block transfer in a unidirectional mode;

first, second and third multiplexers each connected to all of said first, second and third memory areas by said first, second and third bidirectional data buses, respectively;

a first unidirectional data bus coupling the output of said first multiplexer to a first input of said field interpolator;

a second unidirectional data bus coupling the output of said second multiplexer to a second input of said field interpolator;

a fourth bidirectional data bus coupling said third multiplexer to said movement detector and used for word-section/word-block transfer in a undirectional mode;

a sequence control circuit for controlling said movement detector, said first, second and third multiplexers, said field interpolator and said memory; said sequence control circuit controlling the storing of data words into said first, second and third memory areas at a horizontal frequency rate and controlling the reading of stored data words from said first, second and third memory areas at twice the horizontal frequency rate;

said sequence control circuit operating such that the first and second word blocks of an nth line, the first and second word blocks of line n+1, and the first and second word blocks of line n+2 are written in direct succession into said first, second, third, first, second and third memory areas respectively where n=1, 4, N/2 and N=the number of frame lines or the number of frame lines only containing picture information;

said sequence control circuit further operating such that each data word of a line of a second field is divided into two sections and the first word section of an mth line, the second word section of said mth line, the first and second word sections of line m+1, the first and second word sections of line m+2 are written in direct succession into said second, third, first, second, third and first memory areas, respectively;

said sequence control circuit further operating such that during the second half of the duration of a triple sequence of successive lines, data words of the respective triple sequence which are delayed by one frame period are read from said frame memory and compared with the data words of the triple sequence in said movement detector, and that during the first half of the duration of the next triple sequence, said data words, together with movement information are written into those of said first, second and third memory areas which contain the data word delayed by one frame period, and wherein said first and second word blocks of each data word are read out together with the corresponding word sections of each data word of the respective triple sequence.

2. A television receiver whereby an interlaced video signal containing fields is reproduced flicker-free, said receiver comprising:

a digital movement detector receiving digital video signals;

a digital field interpolator having an output which provides said digital flicker-free video signal;

a single frame memory which is divided into first, second and third memory areas;

first, second and third bidirectional data buses each respectively associated with said first, second and third memory areas and used for word-section/word-block transfer in a unidirectional mode;

first, second and third multiplexers each connected to all of said first, second and third memory areas by said first, second and third bidirectional data buses, respectively;

a first unidirectional data bus coupling the output of said first multiplexer to a first input of said field interpolator;

a second unidirectional data bus coupling the output of said second multiplexer to a second input of said field interpolator;

a fourth bidirectional data bus coupling said third multiplexer to said movement detector and used for word-section/word-block transfer in a undirectional mode;

a sequence control circuit for controlling said movement detector, said first, second and third multiplexers, said field interpolator and said memory; said sequence control circuit controlling the circuitry of data words into said first, second and third memory areas at a horizontal frequency rate and controlling the reading of stored data words from said first, second and third memory areas at twice the horizontal frequency rate;

said sequence control circuit operating such that each data word of an nth line of a first field is divided into first, second and third word blocks which are written in direct succession into said first, second, and third memory areas, respectively where n=1, 2...N/2 and N=the number of frame lines or the number of lines containing only picture information;

said sequence control circuit further operating such that each data word of an mth line of a second field is divided into first, second and third word sections which are written in direct succession into said second, third and first memory areas, respectively, where $m=1+N/2, 2+N/2 ... N;$ said sequence control circuit further operating such that during the second half of the duration of an mth line and an nth line the data word of the respective mth line and nth line which is delayed by one frame period is read from the frame memory and compared with the data word of the mth line and nth line, respectively in said movement detector, and that during the first half of the duration of lines n+1 and m+1, the data word delayed by one frame period, together with the movement information, is written into those of said first, second and third memory areas which contain the data word delayed by one frame period;

said first, second and third word blocks of each data word of the nth line are read out together with the corresponding word sections of each data word of the mth line.

3. A television receiver whereby an interlaced video signal containing fields is reproduced flicker-free, said receiver comprising:

a digital movement detector receiving digital video signals;

a digital field interpolator having an output which provides said digital flicker-free video signal;

a single frame memory which is divided into first, second and third memory areas;

first, second and third bidirectional data buses each respectively associated with said first, second and third memory areas and used for word-section/word-block transfer in a unidirectional mode;

first, second and third multiplexers each connected to all of said first, second and third memory areas by said first, second and third bidirectional data buses, respectively;

a first unidirectional data bus coupling the output of said first multiplexer to a first input of said field interpolator;

a second unidirectional data bus coupling the output of said second multiplexer to a second input of said field interpolator;

a fourth bidirectional data bus coupling said third multiplexer to said movement detector and used for word-section/word-block transfer in a undirectional mode;

a sequence control circuit for controlling said movement detector, said first, second and third multiplexers, said field interpolator and said memory; said sequence control circuit controlling the circuitry of data words into said first, second and third memory areas at a horizontal frequency rate and controlling the reading of stored data words from said first, second and third memory areas at twice the horizontal frequency rate;

said sequence control circuit operating such that each data word of a line of a first field is divided into first, second, third and fourth blocks; said first, second, third and fourth blocks of an nth line are written respectively into said first, second, third and first memory areas; said first, second third and fourth blocks of line n+1 are written respectively into said second, third, first and second memory areas, and said first, second, third and fourth blocks of line n+2 are written into said third, first, second and third memory areas; where n=1, 4 ... N/2;

said sequence control circuit further operating such that each data word of a line of a second field is divided into first, second, third and fourth sections; said first, second, third and fourth sections of an mth line are written into said second, third, first and second memory areas, respectively; said first, second, third and fourth sections of line m+1 are written into said third, first, second and third memory areas, respectively; and said first, second, third and fourth sections of line m+2 are written into said first, second, third and fourth memory areas, respectively; where $m=1+N/2, 4+N/2 \ldots N$;

said sequence control circuit further operating such that during the second half of the duration of a triple sequence of successive lines, those data words of the respective triple sequence delayed by one frame period are read from said memory and compared with the data words of the triple sequence in said movement detection; and that during the first half of the next triple sequence said data words, together with the movement information, are written into those of said first, second and third memory areas which contain data words delayed by one frame period; and said first, second, third and fourth word blocks are read out together with the corresponding word sections of each data word of the mth line.

* * * * *